United States Patent

Usuda et al.

[15] 3,701,857

[45] Oct. 31, 1972

[54] MULTIFREQUENCY SIGNAL RECEIVING CIRCUIT

[72] Inventors: Shogo Usuda, Yokohama; Susumu Mizusawa, Kawasaki; Harunobu Tateno, Yokohama, all of Japan

[73] Assignees: Fujitsu Limited; Nippon Telegraph & Telephone Public Corporation

[22] Filed: June 28, 1971

[21] Appl. No.: 157,361

[30] Foreign Application Priority Data

July 3, 1970 Japan ......................45/57734

[52] U.S. Cl. ..............................................179/84 VF

[51] Int. Cl. ...........................H04m 1/50, H04q 9/12

[58] Field of Search ..................................179/84 VF

[56] References Cited

UNITED STATES PATENTS

| | | | |
|---|---|---|---|
| 3,128,349 | 4/1964 | Boesch et al. | 179/84 VF |
| 3,288,940 | 11/1966 | Bennett et al. | 179/84 VF |
| 3,539,731 | 11/1970 | Legedza | 179/84 VF |

*Primary Examiner*—Kathleen H. Claffy
*Assistant Examiner*—William A. Helvestine
*Attorney*—Curt M. Avery et al.

[57] ABSTRACT

A plurality of bandpass filters equal in number to the number of frequencies of multifrequency input signals supplied thereto select the input signals. Each of a plurality of signal detectors is connected to a corresponding one of the bandpass filters and provides pulse trains corresponding to the frequencies of the signals selected by the bandpass filters. A plurality of OR gates is provided. Each of the OR gates has a first input connected to the output of a corresponding one of the signal detectors, a second input and an output. An additional OR gate has a plurality of inputs each connected to the output of a corresponding one of the signal detectors and an output for providing an output pulse train. A rectifier circuit has an input connected to the output of the additional OR gate and converts the output pulse train of the additional OR gate into continuous signals. A plurality of AND gates is provided. Each of the AND gates has a first input connected to the output of a corresponding one of the plurality of OR gates, a second input connected to the output of the rectifier circuit and an output connected to the second input of a corresponding one of the plurality of OR gates. The outputs are derived from the outputs of the AND gates.

3 Claims, 9 Drawing Figures

MULTIFREQUENCY SIGNAL RECEIVING CIRCUIT

DESCRIPTION OF THE INVENTION

The invention relates to a multifrequency signal receiving circuit. More particularly, the invention relates to a multifrequency signal receiving circuit in which the received multifrequency signals are rectified by a single common rectifier circuit instead of a plurality of rectifier circuits corresponding in number to the plurality of frequencies of the signals.

As is well known, codes are sometimes transmitted via a communication system by utilizing multifrequency signals. A conventional multifrequency signal receiving circuit for receiving the multifrequency signals transmitted via a multifrequency signal system is hereinafter shown and described.

The principal object of the invention is to provide a multifrequency signal receiving circuit utilizing a single rectifier circuit.

An object of the invention is to provide a multifrequency signal receiving circuit which overcomes the disadvantages of known multifrequency signal receiving circuits.

An object of the invention is to provide a multifrequency signal receiving circuit which is of simple structure, small size and inexpensive in production.

An object of the invention is to provide a multifrequency signal receiving circuit of simple structure which operates with efficiency, effectiveness and reliability.

Another object of the invention is to provide a multifrequency signal receiving circuit rectifier circuit of simple structure which is inexpensive in manufacture and functions with efficiency, effectiveness and reliability.

In accordance with the invention, a multifrequency signal receiving circuit comprises input means for providing multifrequency input signals. A plurality of bandpass filters equal in number to the number of frequencies of the multifrequency input signals are connected in common to the input means for selecting the input signals. A plurality of signal detectors each has an input connected to a corresponding one of the bandpass filters and an output for providing pulse trains corresponding to the frequencies of the signals selected by the bandpass filters. A plurality of OR gates each has a first input connected to the output of a corresponding one of the signal detectors, a second input and an output. An additional OR gate has a plurality of inputs each connected to the output of a corresponding one of the signal detectors and an output for providing an output pulse train. A rectifier circuit has an input connected to the output of the additional OR gate and an output for converting the output pulse train of the additional OR gate into continuous signals. A plurality of AND gates each has a first input connected to the output of a corresponding one of the plurality of OR gates, a second input connected to the output of the rectifier circuit and an output connected to the second input of a corresponding one of the plurality of OR gates. Output means connected to the outputs of the AND gates provides continuous output signals.

The rectifier circuit comprises an input terminal connected to the output of the additional OR gate, a capacitor connected to the input terminal, a resistor, and a diode connected in parallel with the resistor. The parallel-connected resistor and diode are connected in series between the capacitor and a point at ground potential. An inverter circuit is connected to a common point in the connection between the capacitor and the parallel-connected resistor and diode. A NAND gate has a first input connected to the input terminal, a second input connected to the inverter circuit and an output, and an output terminal connected to the output of the NAND gate.

The rectifier circuit comprises an input terminal connected to the output of the additional OR gate, a capacitor connected to the input terminal, and a resistor connected in series circuit arrangement with the capacitor. An inverter circuit is connected to the series circuit arrangement. Means is provided for applying a positive potential to a common point in the connection between the series circuit arrangement and the inverter circuit. An OR gate has a first input connected to the input terminal, a second input connected to the inverter circuit and an output. An output terminal is connected to the output of the OR gate.

In order that the invention may be readily carried into effect, it will now be described with reference to the accompanying drawings, wherein.

Figure 1:
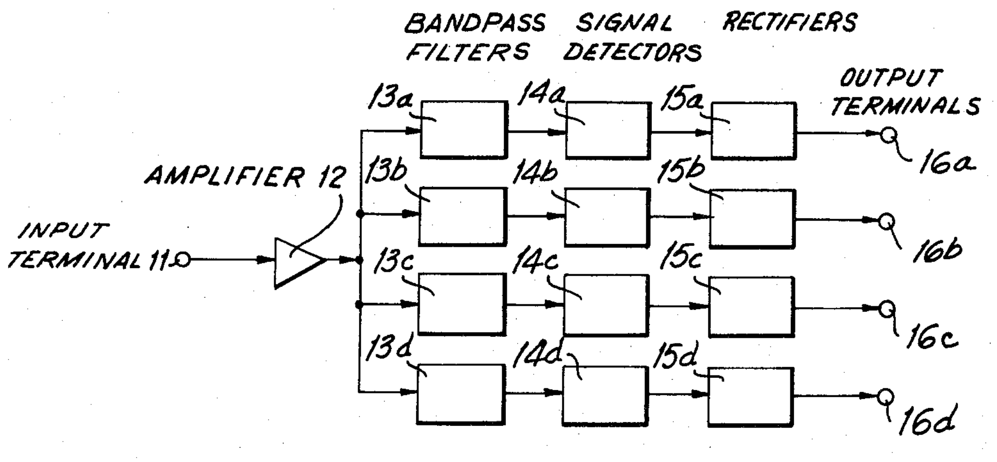
FIG. 1 PRIOR ART
FIG. 1 is a block diagram of a conventional multifrequency signal receiving circuit.

FIG. 1 shows a conventional multifrequency signal receiving circuit. In FIG. 1, multifrequency signals are supplied to an input terminal 11, and from said input terminal through an amplifier 12 in common to the inputs of a plurality of bandpass filters 13*a*, 13*b*, 13*c* and 13*d*. The amplifier 12 provides impedance conversion and amplifies the multifrequency signals to a suitable level. When necessary, the amplifier 12 provides amplitude limitation.

The bandpass filters 13*a* to 13*d* select the multifrequency signals in accordance with the band characteristics of said filters. The selected multifrequency signals are supplied to a plurality of signal detectors 14*a*, 14*b*, 14*c* and 14*d*. The output of the bandpass filter 13*b* is connected to the input of the signal detector 14*b*. The output of the bandpass filter 13*c* is connected to the input of the signal detector 14*c*. The output of the bandpass filter 13*d* is connected to the input of the signal detector 14*d*. Each of the signal detectors may comprise any known signal detector such as, for example, a Schmitt trigger circuit, or the like.

The signal detectors 14*a* to 14*d* produce pulse trains having frequencies or repetition rates equivalent to the signals, when the magnitude of the output signals of the bandpass filters 13*a* to 13*d* exceeds the threshold level of said signal detectors. The pulse trains produced by the signal detectors 14a to 14d are supplied to rectifiers 15a, 15b, 15c and 15d. The output of the signal detector 14a is connected to the output of the rectifier 15a. The output of signal detector 14b is connected to the input of the rectifier 15b. The output of the signal detector 14c is connected to the input of the rectifier 15c. The output of the signal detector 14d is connected to the input of the rectifier 15d.

The rectifiers 15a to 15d rectify, smooth and shape the pulse trains and convert them into continuous wave signals. The continuous wave signals are derived from a plurality of output terminals 16a, 16b, 16c and 16d, each of which is connected to the output of a corresponding one of the rectifiers 15a to 15d. The conventional multifrequency signal receiving circuit of FIG. 1 has several disadvantages. The structure of the circuit is complicated and its size cannot be reduced. The circuit is expensive because the rectifiers 15a to 15d have to be provided in a number which is equal to the number of signal detectors 14a to 14d. Furthermore, a capacitor of large capacitance is required in each of the rectifiers 15a to 15d, so that it is difficult to provide an integrated circuit.

Figure 2:
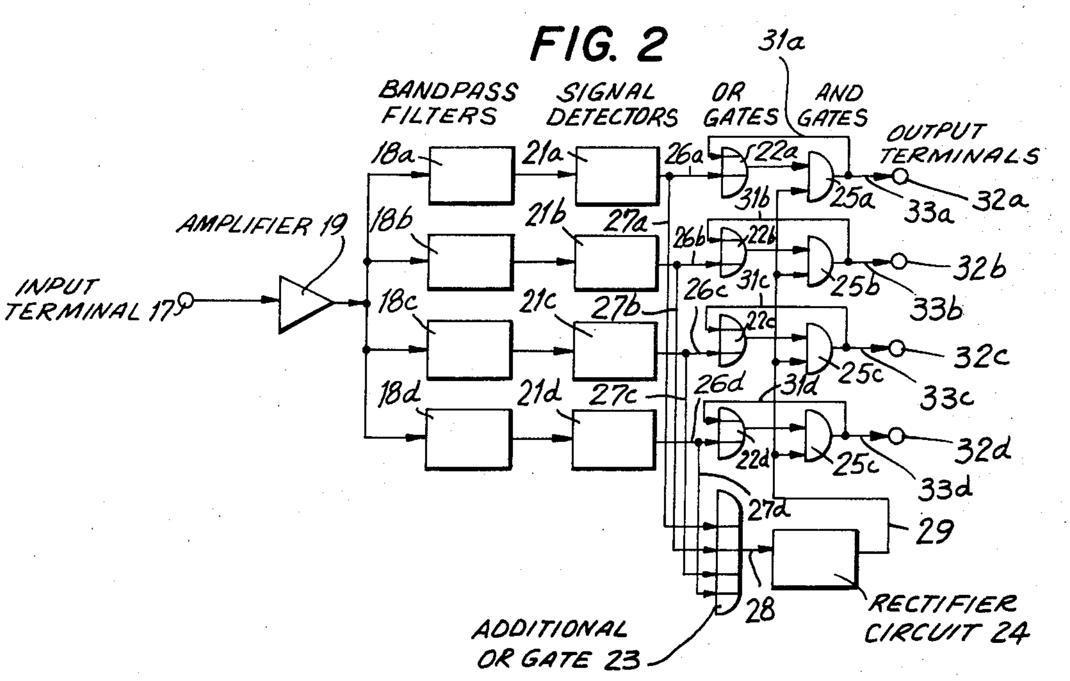
FIG. 2 is a block diagram of an embodiment of the multifrequency signal receiving circuit of the invention.

FIG. 2 illustrates the multifrequency signal receiving circuit of the convention. In FIG. 2, the multifrequency signals are supplied to an input terminal 17, and from said input terminal, in common to the inputs of a plurality of bandpass filters 18a, 18b, 18c and 18d via an amplifier 19. A plurality of signal detectors 21a, 21b, 21c and 21d are connected to the bandpass filters 18a to 18d. The input terminal 17, the bandpass filters 18a to 18d, the amplifier 19 and the signal detectors 21a to 21d are connected to each other, and function in the same manner as the corresponding components of FIG. 1.

In accordance with the invention, a plurality of OR gates 22a, 22b, 22c and 22d, an additional OR gate 23, a rectifier circuit 24 and a plurality of AND gates 25a, 25b, 25c and 25d are provided. The output of the signal detector 21a is connected to a first input of the OR gate 22a via a lead 26a and to a first input of the additional OR gate 23 via a lead 27a. The output of the signal detector 21b is connected to a first input of the OR gate 22b via a leas 26b and to a second input of the additional OR gate 23 via a lead 27b. The output of the signal detector 21c is connected to a first input of the OR gate 22c via a lead 26c and to a third input of the additional OR gate 23 via a lead 27c. The output of the signal detector 21d is connected to a first input of the OR gate 22d via a lead 26d and to a fourth input of the additional OR gate 23 via a lead 27d. The output of the additional OR gate 23 is connected to the input of the rectifier circuit 24 via a lead 28. The output of the OR gate 22a is connected to a first input of the AND gate 25a. The output of the OR gate 22b is connected to a first input of the AND gate 25b. The output of the OR gate 22c is connected to a first input of the AND gate 25c. The output of the OR gate 22d is connected to a first input of the AND gate 25d. The output of the rectifier circuit 24 is connected in common to a second input of each of the AND gates 25a to 25d via a lead 29.

The output of the AND gate 25a is connected to a second input of the OR gate 22a via a lead 31a and to an output terminal 32a via a lead 33a. The output of the AND gate 25b is connected to a second input of the OR gate 22b via a lead 31b to an output terminal 32b via a lead 33b. The output of the AND gate 25c is connected to a second input of the OR gate 22c via a lead 31c and to an output terminal 32c via a lead 33c. The output of the AND gate 25d is connected to a second input of the OR gate 22d via a lead 31d and to an output terminal 32d via a lead 33d.

The additional OR gate 23 is provided in common to the frequencies of the multifrequency signals, as is the rectifier circuit 24. The multifrequency signals supplied to the input terminal 17 are supplied to the input amplifier 19 which provides impedance conversion of said multifrequency signals, amplifies said signals to a suitable level and provides amplitude limitation, where necessary. The output signals of the amplifier 19 are supplied to the bandpass filters 18a to 18d which select the multifrequency signals in accordance with the band characteristics of said filters. The selected signals are supplied to the signal filters 21a to 21d.

Pulse trains having pulse repetition rates or frequencies equivalent to the multifrequency signals are produced by the signal detectors 21a to 21d when the magnitude of the output signals of the bandpass filters 18a to 18d exceeds the threshold limit of said signal detectors. The pulse trains produced by the signal detectors 21a to 21d are supplied to the plurality of OR gates 22a to 22d and to the four inputs of the additional OR gate 23. Consequently, the OR gate 23 produces a pulse train for the rectifier circuit 24. The rectifier circuit 24 converts the pulse train into a waveform, as hereinafter described.

The output signals from the rectifier circuit 24 are supplied to the second inputs of the AND gates 25a to 25d. Simultaneously, the pulse trains are supplied from the plurality of OR gates 22a to 22d to the first inputs of the AND gates 25a to 25d. The AND gates 25a to 25d thus acquire the output signals of the rectifier circuit 24 and the OR gates 22a to 22d and each of said AND gates produces an output signal only when a signal is supplied to each of its first and second inputs.

If, for example, a signal is supplied to each of the first and second inputs of the AND gate 25b, said AND gate produces an output signal at the output terminal 32b and also supplies a signal to the second input of the OR gate 22b. Therefore, as long as the rectifier circuit 24 produces an output signal, a continuous output is provided at the output terminal 32b.

The purpose of the leads 31a to 31d from the outputs of the AND gates 25a to 25d to the second inputs of the corresponding OR gates 22a to 22d is to prevent the control of the outputs of said AND gates by the signals supplied to the rectifier circuit 24, and that is, the output signals of the signal detectors 21a to 21d, and to provide self-maintenance of the outputs of said AND gates. When there are no input signals supplied to the input terminal 17, the rectifier circuit 24 does not produce the output signal, and there is no signal provided at any of the output terminals 32a to 32d.

A rectifier circuit having a smoothing circuit comprising a capacitor, a diode connected in series with the capacitor, and a parallel circuit having a resistor and a smoothing capacitor through which the cathode of the diode is connected to a point at ground potential, has previously been utilized as the rectifier circuit 24 of FIG. 2. When such a rectifier circuit is utilized, a smoothing capacitor of relatively large capacitance is required. Furthermore, the speed of response at the start and stop of the charging of the capacitor is slow, so that the waveforms of the output signals of the rectifier circuit are deformed. It is thus necessary to provide a separate pulse shaping circuit to compensate for the deformation of the waveform, so that the conventional rectifier circuit has a complicated circuit structure.

Figure 3:
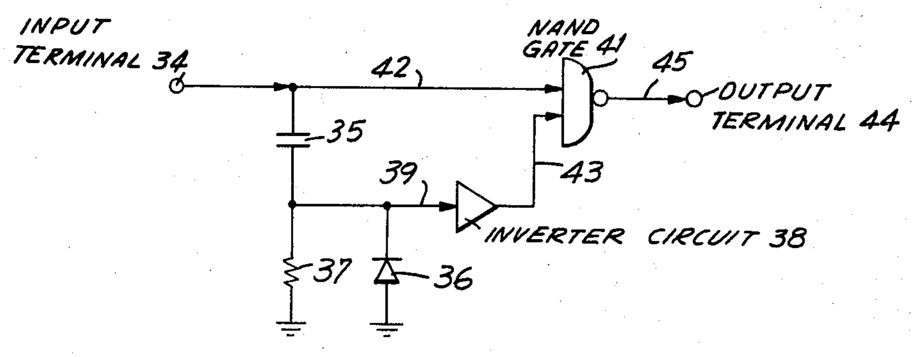
FIG. 3 is a circuit diagram of an embodiment of the rectifier circuit of FIG. 2.

In accordance with the invention, a preferred embodiment of a rectifier circuit, which is of simple structure, is shown in FIG. 3. FIGS. 4*a*, 4*b*, 4*c* and 4*d* illustrate the waveforms appearing at different points in the rectifier circuit of FIG. 3. In FIG. 3, an input terminal 34 is connected to the output of the additional OR gate 23 of FIG. 2. A capacitor 35 is connected to the input terminal 34. A diode 36 is connected in parallel with a resistor 37. The parallel-connected resistor 37 and diode 36 are connected in series between the capacitor 35 and a point at ground potential. An inverter circuit 38 has an input connected to a common point in the connection between the capacitor 35 and the parallel-connected resistor 37 and diode 36 via a lead 39.

The input terminal 34 is connected to a first input of a NAND gate 41 via a lead 42. The output of the inverter circuit 38 is connected to the second input of the NAND gate 41 via a lead 43. The output of the NAND gate 41 is connected to an output terminal 44 via a lead 45.

The pulse signal trains from the signal detectors 21*a* to 21*d* of FIG. 2 are supplied via the additional OR gate 23 of FIG. 2 to the input terminal 34 of FIG. 3. The input terminal 34 is grounded via the capacitor 35 and the resistor 37 connected in series therewith. Although the resistor 37 is grounded in FIG. 3, it is generally either grounded or connected to the positive plurality terminal of a DC power source depending upon whether the input pulse signals are of positive polarity or negative polarity. Although the diode 36 is for cramping purposes, said diode may be omitted if the duty cycle and amplitude of the pulses are sufficient to insure the inverting operation of the inverter circuit 38.

The voltage of the input of the inverter circuit 38 is not decreased to less than the forward voltage VF of the diode 36 due to the operation of said diode, however, although said voltage is negative. Therefore, the time constants of the resistor 37 and the diode 36 may be made small and a capacitor having a small capacitance may be utilized as the capacitor 35.

Figure 4A:
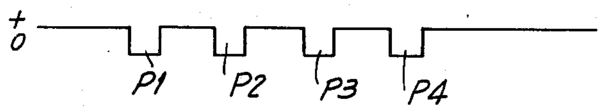
FIGS. 4a, 4b, 4c and 4d are waveforms appearing at different points of the rectifier circuit of FIG. 3.
Figure 4B:
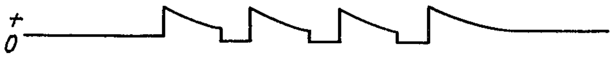
Figure 4C:
Figure 4D:
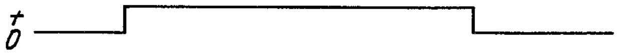

FIG. 4*a* shows the waveforms of the pulse signals P1, P2, P3 and P4 supplied to the input terminal 34 of the rectifier circuit of FIG. 3. If the pulse signals of FIG. 4*a* are not supplied to the input terminal 34, said input terminal is held at a positive potential relative to the ground. In this condition, the input of the inverter circuit 38 is at zero potential, as shown in FIG. 4*b*, and is cut off from direct current from the input terminal 34 by the capacitor 35. Therefore, the output of the inverter circuit 38 is at a positive potential, as shown in FIG. 4*c*. Since the two inputs of the NAND gate 41 are both at positive potential, the output of this NAND gate is at zero potential, as shown in FIG. 4*d*.

The input pulse signals P1, P2, P3 and P4 have a designated time slot between adjacent pulses, as shown in FIG. 4*a*. When such input pulse signals are supplied to the input terminal 34, said input terminal is at zero potential and the first input of the NAND gate 41 connected to said input terminal via the lead 42, is also at zero potential. The NAND gate 41 thus produces a positive potential output at the output terminal 44. At such time, the input of the inverter circuit 38 is liable to be provided with a negative potential by the capacitor 35, but is cramped to zero potential by the diode 36. Consequently, the output of the inverter circuit 38 is maintained at a positive potential.

When the input terminal 34 is returned to a positive potential, the input of the inverter circuit 38 is provided with a positive potential due to the flow of charging current through the capacitor 35 to the resistor 37 and the input of said inverter circuit. The output of the inverter circuit 38, and therefore the second input of the NAND gate 41, then reaches zero potential. The output terminal 44 is then maintained at a positive potential, as shown in FIG. 4*d*.

The time constant determined by the resistor 37, the capacitor 35 and the input impedance of the inverter circuit 38 is selected to a suitable value so that sufficient input current may be supplied to said inverter circuit during the intervals of the pulse train, that is, during the time periods between the pulse signals P1 and P2, the period between the pulse signals P2 and P3, and the period between the pulse signals P3 and P4. The output terminal 44 may thus be repeatedly reset to zero potential after the pulse train is no longer supplied. Thus, while the pulse train is supplied to the input terminal 34, the output terminal 44 is maintained at positive potential to the aforedescribed operation. After the supply of the pulse train is halted, the output terminal 44 is reset to zero potential and the pulse signals P1, P2, P3 and P4 are converted into continuous signals, as shown in FIG. 4*d*, when the charging signal of the capacitor 35 is decreased to a specific magnitude.

Figure 5:
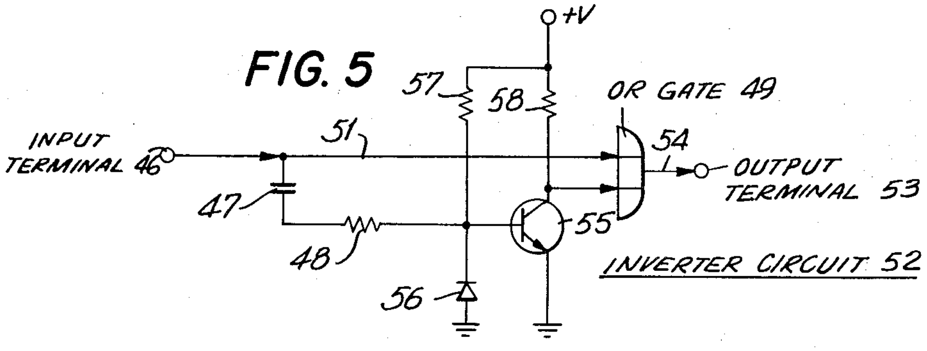
FIG. 5 is a circuit diagram of another embodiment of the rectifier circuit of FIG. 2.

FIG. 5 shows another embodiment of the rectifier circuit of FIG. 2. In the rectifier circuit of FIG. 3, a negative polarity pulse time is supplied to the input terminal 34, whereas in the rectifier circuit of FIG. 5, a positive polarity pulse train is supplied to an input terminal 46. In the embodiment of FIG. 5, the input terminal 46 is connected to the output of the additional OR gate 23 of FIG. 2 via the lead 28. A capacitor 47 is connected to the input terminal 46. A resistor 48 is connected in series circuit arrangement with the capacitor 47. The input terminal 46 is connected to a first input of an OR gate 49 via a lead 51.

An inverter circuit 52 has an input connected to the series circuit arrangement 47, 48 and an output connected to a second input of the OR gate 49. The output of the OR gate 49 is connected to an output terminal 53 via a lead 54. The inverter circuit 52 comprises a transistor 55 having an emitter electrode connected to a point at ground potential. The base electrode of the transistor 55 is connected to the series circuit arrangement 47, 48. The base electrode of the transistor 45 is connected to a point at ground potential via a diode 56 and is also connected to the positive polarity terminal +V of a DC power source via a resistor 57. The collector electrode of the transistor 55 is connected to the positive polarity terminal +V of the voltage source via a resistor 58 and is also connected to the second input of the OR gate 49.

Although the embodiment of the rectifier circuit of FIG. 3 utilizes a NAND gate 41 and the embodiment of the rectifier circuit of FIG. 5 utilizes an OR gate 49, a different logical circuit may be utilized instead. The rectifier circuit may be connected in the multifrequency signal receiving circuit of the invention in a preferable manner by utilizing suitable logical circuitry, such as, for example, a NOR gate, and AND gate or an OR gate corresponding to the input pulse signal train, the polarity of the continuous signal output waveform at the output terminal and the power source utilized.

Figure 6:
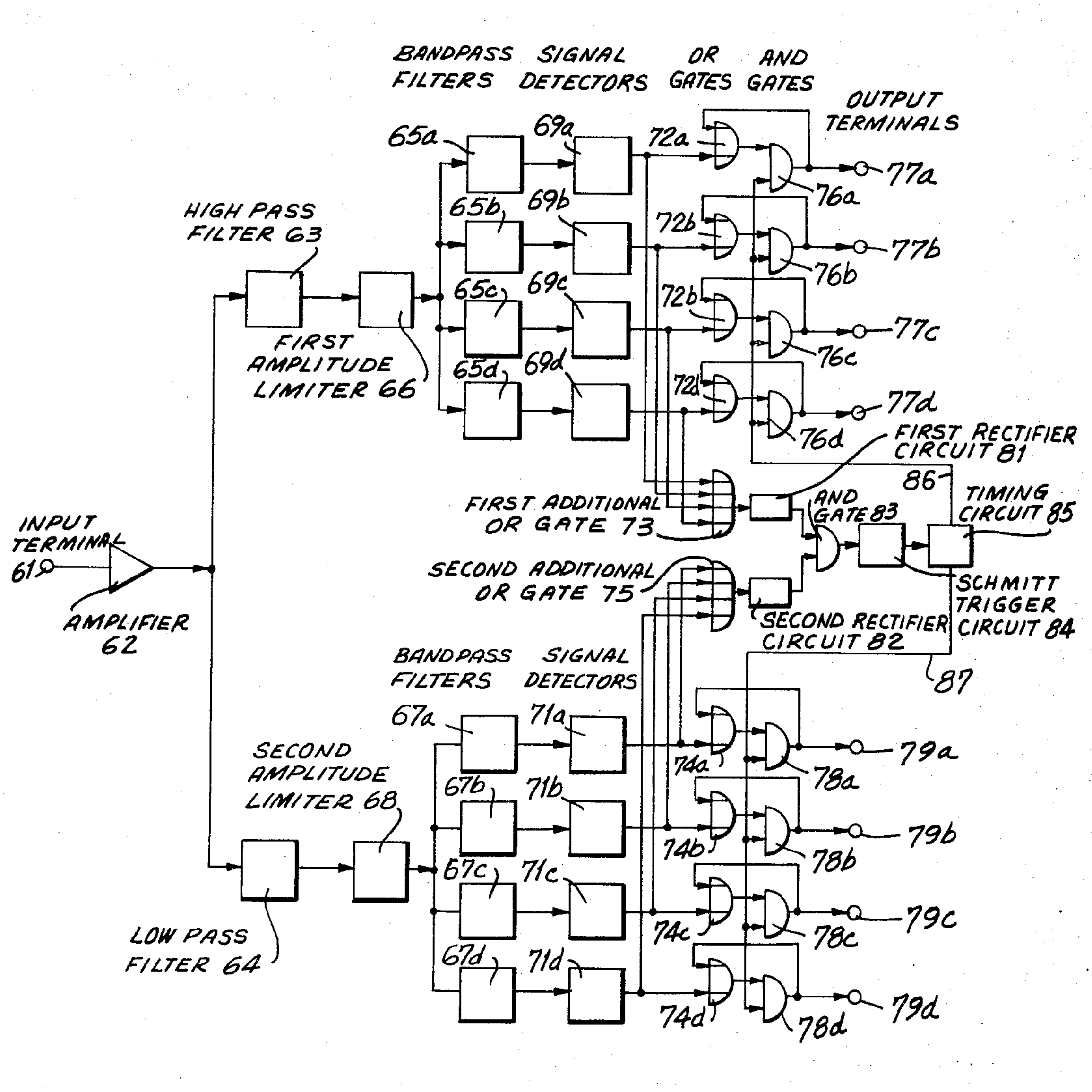
FIG. 6 is a block diagram of a signal detecting system of a pushbutton telephone dialing system utilizing the multifrequency signal receiving circuit of the invention.

FIG. 6 discloses a 4 by 4 receiving system of a pushbutton telephone dialing system utilizing the multifrequency signal receiving circuit of the invention. The bandpass filters, signal detectors, OR gates, additional OR gates, AND gates, amplifier, input terminal and output terminals of FIG. 6 are the same as those in FIG. 2. Thus, FIG. 6 discloses a combination of two multifrequency signal circuits as disclosed in FIG. 2.

In FIG. 6, an input terminal 61 is connected to an amplifier 62, which is connected in common to the input of a high pass filter 63 and a low pass filter 64. The output of the high pass filter 63 is connected in common to the inputs of a plurality of bandpass filters **65*a*, 65*b*, 65*c* and 65*d* via a first amplitude limiter 66. The output of the low pass filter 64 is connected in common to the inputs of a second plurality of bandpass filters 67*a*, 67*b*, 67*c* and 67*d* via a second amplitude limiter 68. A plurality of signal detectors 69*a*, 69*b*, 69*c* and 69*d* are connected to the bandpass filters 65*a* to 65*d* in the same manner as in FIG. 2. A plurality of signal detectors 71*a*, 71*b*, 71*c* and 71*d* are connected to the bandpass filters 67*a* to 67*d*** in the same manner as in FIG. 2.

A plurality of OR gates **72*a*, 72*b*, 72*c* and 72*d* and a first additional OR gate 73 are connected to the signal detectors 69*a* to 69*d* in the same manner as in FIG. 2. A plurality of OR gates 74*a*, 74*b*, 74*c* and 74*d* and a second additional OR gate 75 are connected to the signal detectors 71*a* to 71*d* in the same manner as in FIG. 2. A plurality of AND gates 76*a*, 76*b*, 76*c* and 76*d* are connected to the OR gates 72*a* to 72*d* in the same manner as in FIG. 2 and are connected to the output terminals 77*a*, 77*b*, 77*c* and 77*d* in the same manner as in FIG. 2. A plurality of AND gates 78*a*, 78*b*, 78*c* and 78*d* are connected to the OR gates 74*a* to 74*d* in the same manner as in FIG. 2 and are connected to a plurality of output terminals 79*a*, 79*b*, 79*c* and 79*d* in the same manner as in FIG. 2**.

The output of the first additional OR gate 73 is connected to the input of a first rectifier circuit 81. The output of the second additional OR gate 75 is connected to the input of a second rectifier circuit 82. The output of the first rectifier circuit 81 is connected to a first input of an AND gate 83. The output of the second rectifier circuit 82 is connected to the second input of the AND gate 83. The output of the AND gate 83 is connected to the input of a Schmitt trigger circuit 84. The output of the Schmitt trigger circuit 84 is connected to the input of a timing circuit 85. One output of the timing circuit 85 is connected in common to the second input of each of the AND gates **76*a* to 76*d* via a lead 86. Another output of the timing circuit 85 is connected to the second input of each of the AND gates 78*a* to 78*d* via a lead 87**.

Two-frequency signals are supplied to the input terminal 61. The two-frequency signals comprise a low frequency group and a high frequency group of eight-frequency signals. The eight-frequency signals are amplified by the amplifier 62 and are divided into high frequency signals by the high pass filter 63 and into the low frequency signals by the low pass filter 64. The amplitude of the high frequency signal output of the high pass filter 63 is limited by the first amplitude limiter 66. The amplitude of the low frequency signal output of the low pass filter 64 is limited by the second amplitude limiter 68.

As in FIG. 2, the signal detectors **69*a* to 69*d* and the signal detectors 71*a* to 71*d* produce pulse trains at their outputs. The output signals of the first additional OR gate 73 are rectified by the first rectifier circuit 81 and the output signal of the second additional OR gate 75 are rectified by the second rectifier circuit 82**. The signal detecting system of the pushbutton telephone dialing system is required to provide a group checking function of supervising the duration in which the high frequency group and the low frequency group both appear and the timing function of determining the duration of common appearance of high frequency group and the low frequency group.

In order to accomplish the aforementioned functions, the duration of the input signal is supervised by the AND gate 83 and the Schmitt trigger circuit 84. When the duration of the input signals exceeds a specific constant magnitude, the Schmitt trigger circuit 84 supplies output pulses to the timing circuit 85. The timing circuit 85 preferably comprises a monostable multivibrator. The timing circuit 85 is triggered by the output pulses of the Schmitt trigger circuit 84 and produces pulse signals of constant pulse duration or width. The output pulses of the timing circuit 85 are supplied to the AND gates **76*a* to 76*d* and are derived at the output terminals 77*a* to 77*d* and 79*a* to 79*d***.

In the conventional multifrequency signal receiving circuit, the multifrequency signals are detected by a plurality of detectors equal in number to the frequencies in order to provide pulse trains. The pulse trains are rectified by an equal number of rectifiers. In the present invention, however, the multifrequency signals are rectified by a common rectifier which provides continuous signals so that the circuit structure is greatly simplified, the size of the circuit may be reduced and the multifrequency signal receiving circuit may be manufactured inexpensively. Furthermore, the rectifier circuit of the invention eliminates the need for large capacitance capacitors and permits the provision of integrated circuitry with facility.

While the invention has been described by means of specific examples and in specific embodiments, we do not wish to be limited thereto, for obvious modifications will occur to those skilled in the art without departing from the spirit and scope of the invention.

We claim:

1. A multifrequency signal receiving circuit, comprising input means for providing multifrequency input signals; a plurality of bandpass filters equal in number to the number of frequencies of the multifrequency input signals connected in common to the input means for selecting the input signals; a plurality of signal detectors each having an input connected to a corresponding one of the bandpass filters and an output for providing pulse trains corresponding to the frequencies of the signals selected by the bandpass filters; a plurality of OR gates each having a first input connected to the output of a corresponding one of the signal detectors, a second input and an output; an additional OR gate having a plurality of inputs each connected to the output of a corresponding one of the signal detectors and an output for providing an output pulse train; a rectifier circuit having an input connected to the output of the additional OR gate and an output for converting the output pulse train of the additional OR gate into continuous signals; a plurality of AND gates each having a first input connected to the output of a corresponding one of the plurality of OR gates, a second input connected to the output of the rectifier circuit and an output connected to the second input of a corresponding one of the plurality of OR gates; and output means connected to the outputs of the AND gates for providing continuous output signals.

2. A multifrequency signal receiving circuit as claimed in claim 1, wherein the rectifier circuit comprises an input terminal connected to the output of the additional OR gate, a capacitor connected to the input terminal, a resistor, a diode connected in parallel with the resistor, the parallel-connected resistor and diode being connected in series between the capacitor and a point at ground potential, an inverter circuit connected to a common point in the connection between the capacitor and the parallel-connected resistor and diode, a NAND gate having a first input connected to the input terminal, a second input connected to the inverter circuit and an output, and an output terminal connected to the output of the NAND gate.

3. A multifrequency signal receiving circuit as claimed in claim 1, wherein the rectifier circuit comprises an input terminal connected to the output of the additional OR gate, a capacitor connected to the input terminal, a resistor connected in series circuit arrangement with the capacitor, an inverter circuit connected to the series circuit arrangement, means for applying a positive potential to a common point point in the connection between the series circuit arrangement and the inverter circuit, an OR gate having a first input connected to the input terminal, a second input connected to the inverter circuit and an output, and an output terminal connected to the output of the OR gate.

* * * * *